(12) United States Patent
Chou (10) Patent No.: US 7,372,469 B2
(45) Date of Patent: May 13, 2008

(54) IMAGE TRANSFORMING METHOD (75) Inventor: Ming-Te Chou, Keelung (TW)

(73) Assignee: Arcadyan Technology Corporation, Hsinchu (TW)

( * ) Notice: Subject to any disclaimer, the term of this patent is extended or adjusted under 35 U.S.C. 154(b) by 212 days.

(21) Appl. No.: 11/401,964

(22) Filed: Apr. 12, 2006

(65) Prior Publication Data
US 2007/0242087 A1    Oct. 18, 2007

(51) Int. Cl.
*G09G 5/00* (2006.01)
*G09G 5/02* (2006.01)
*G06K 9/00* (2006.01)
*G03F 3/08* (2006.01)
*H04N 1/46* (2006.01)
*H04N 9/74* (2006.01)
*H04N 5/46* (2006.01)
*H04N 9/64* (2006.01)
*H04N 9/67* (2006.01)
*H04N 9/475* (2006.01)
*G09G 9/32* (2006.01)

(52) U.S. Cl. .................. 345/591; 345/589; 345/604; 345/644; 345/649; 348/514; 348/557; 348/583; 358/515; 358/523; 358/525; 382/163; 382/167; 382/295; 382/297

(58) Field of Classification Search ............. 345/427, 345/589–591, 597, 601, 604, 630, 638, 643, 345/644, 649, 657–659, 663–665; 348/514–520, 348/557, 560, 563, 577, 582–584, 659, 663; 358/515–525; 382/162–167, 295–297, 274, 382/300
See application file for complete search history.

(56) References Cited

U.S. PATENT DOCUMENTS

| | | | | |
|---|---|---|---|---|
| 5,923,316 A * | 7/1999 | Kitamura et al. | ........... | 345/603 |
| 5,926,611 A * | 7/1999 | Yang et al. | ........... | 386/112 |
| 6,351,557 B1 * | 2/2002 | Gonsalves | ........... | 382/167 |
| 2004/0196515 A1 * | 10/2004 | Huang et al. | ........... | 358/515 |
| 2005/0213125 A1 * | 9/2005 | Smith et al. | ........... | 358/1.9 |
| 2006/0109490 A1 * | 5/2006 | Park et al. | ........... | 358/1.9 |
| 2006/0120626 A1 * | 6/2006 | Perlmutter et al. | ........... | 382/294 |
| 2006/0146067 A1 * | 7/2006 | Schweng et al. | ........... | 345/591 |
| 2006/0268302 A1 * | 11/2006 | Chen et al. | ........... | 358/1.9 |
| 2007/0064124 A1 * | 3/2007 | Kirani et al. | ........... | 348/234 |
| 2007/0188515 A1 * | 8/2007 | Li | ........... | 345/604 |

\* cited by examiner

*Primary Examiner*—Wesner Sajous
(74) *Attorney, Agent, or Firm*—Birch, Stewart, Kolasch & Birch, LLP (57) ABSTRACT

The present invention provides a method for rotating YUV4:2:0 image in a digital display device, such as TV image system. A YUV4:2:0 image is separated to a Y division matrix and a U and V division matrix. Then the Y division is performed a rotation matrix calculation. And the U and V division matrix is performed a reverse rotation matrix calculation. A rotated YUV4:2:0 image is obtained by combining the processed Y division matrix and the processed U and V division matrix.

22 Claims, 8 Drawing Sheets

IMAGE TRANSFORMING METHOD

BACKGROUND OF THE INVENTION

1. Field of the Invention

This invention relates generally to an image transforming method, especially for transforming YUV4:2:0 color space in an image displaying system.

2. Description of the Prior Art

Generally, human eyes, computer and television using three primary colors, that is: red, green and blue. Originally, to display colors, a displayer should illuminate some luminescence material cover inside of the display. The method for creating color with R, G, B colors is called RGB color space.

Contemporarily, color television system uses YUV color system. The YUV model defines a color space in terms of one luminance and two chrominance components. Y stands for the luminance component (the brightness) and U and V are the chrominance (color) components. YUV is used in the PAL (Phase Alternating Line) and NTSC (National Television Standards Committee) systems of television broadcasting, which is the standard in much of the world. YUV models human perception of color more closely than the standard RGB model used in computer graphics hardware, but not as closely as the HSV color space.

YUV signals are created from an original RGB (red, green and blue) source. The weighted values of R, G and B are added together to produce a single Y signal, representing the overall brightness, or luminance, of that spot. The U signal is then created by subtracting the Y from the blue signal of the original RGB, and then scaling; and V by subtracting the Y from the red, and then scaling by a different factor. This can be accomplished easily with analog circuitry.

The following equations can be used to derive Y, U and V from R, G and B:

$$Y = 0.299R + 0.587G + 0.114B$$
$$U = 0.492(B - Y)$$
$$= -0.147R - 0.289G + 0.436B$$
$$V = 0.877(R - Y)$$
$$= 0.615R - 0.515G - 0.100B$$

And, the following equations can be used to derive Y, U and V from R, G and B:

$$R = Y + 1.14V$$
$$G = Y - 0.39U - 0.58V$$
$$B = Y + 2.03U$$

Downsampling technology is used for efficiently compressing sampling YUV color space. Chromatic subsampling is to express image with lower color (or chroma) signal resolution than brightness signal. The human eyes are not so sensitive to color than to brightness. The color values of image do not need the same resolution as the brightness resolution. Therefore, many video systems use lower sampling resolution in color channel with respect to brightness channel for decreasing the video signal of the total channel without decreasing the imaging quality apparently. The first value in YCbCr or YPbPr color space stands for brightness (Y), and the two values stand for color sampling amount, wherein the U/Cb is in front of the V/Cr. When comparing the quality of image, the ratio between these three values is more important than the three values, and the brightness value is usually 4.

Figure 1:
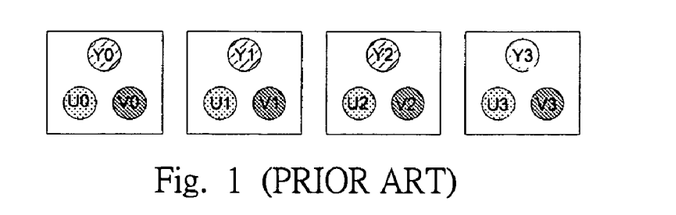
FIG. 1 is a schematic diagram of YUV4:4:4 pixels.
Figure 2:
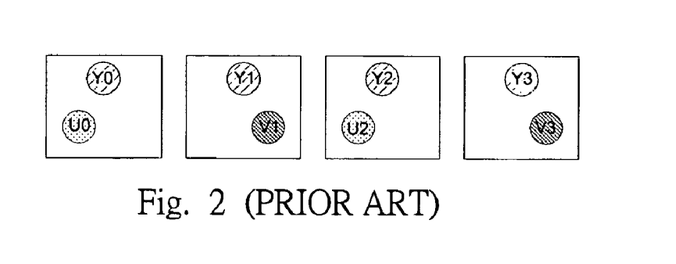
FIG. 2 is a schematic diagram of YUV4:2:2 pixels.

FIG. 1 shows four YUV4:4:4 pixels, and the data stream is: Y0 U0 V0 Y1 U1 V1 Y2 U2 V2 Y3 U3 V3, which can be implied to four pixels: [Y0 U0 V0] [Y1 U1 V1] [Y2 U2 V2] [Y3 U3 V3]. FIG. 2 shows four YUV4:2:2 pixels, wherein the data stream is: Y0 U0 Y1 V1 Y2 U2 Y3 V3, and implying to four pixels: [Y0 U0 V1] [Y1 U0 V1] [Y2 U2 V3] [Y3 U2 V3]. Most high level video format device uses YUV4:2:2, such as: digital betacam, DVCPRO50, D-9, CCIR601/serial digital interface/D1.

Figure 3:
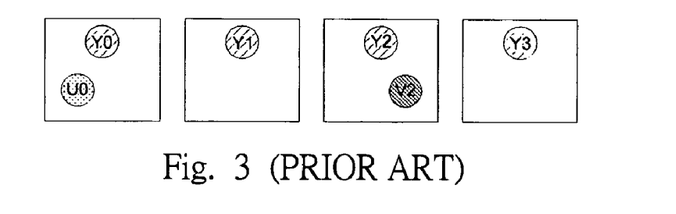
FIG. 3 is a schematic diagram of YUV4:1:1 pixels.

FIG. 3 illustrates four YUV4:1:1 pixels, wherein the data stream is: Y0 U0 Y1 Y2 V2 Y3 and can be implied to four pixels: [Y0 U0 V2] [Y1 U0 V2] [Y2 U0 V2] [Y3 U0 V2]. Some applications use YUV4:1:1, such as: DVCPRO, NTSC DV, DVCAM, D-7.

Figure 4:
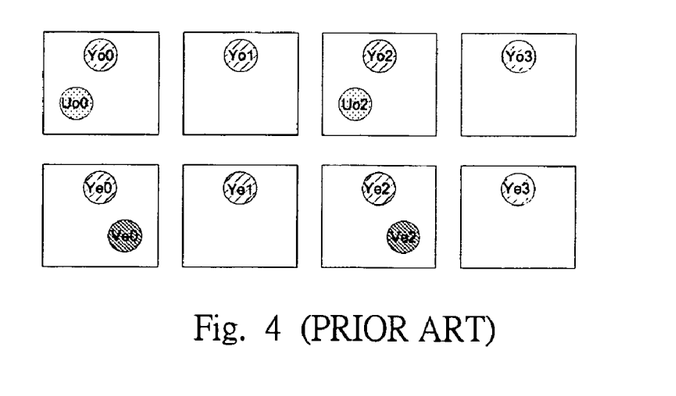
FIG. 4 is a schematic diagram of YUV4:2:0 pixels.

FIG. 4 shows YUV4:2:0 format pixels, wherein the data stream is: Yo0 Uo0 Yo1 Yo2 Uo2 Yo3/Ye0 Ve0 Ye1 Ye2 Ve2 Ye3, and implying to four pixels: [Yo0 Uo0 Ve0] [Yo1 Uo0 Ve0] [Yo2 Uo2 Ve2] [Yo3 Uo2 Ve2]/[Ye0 Uo0 Ve0] [Ye1 Uo0 Ve0] [Ye2 Uo2 Ve2] [Ye3 Uo2 Ve2]. The YUV4:2:0 is a standard PAL and SECAM (Sequential Couleur Avec Memoire) color system, besides it is a standard I/O format using by video encoder/decoder. The YUV4:2:0 is usually applied in DVD and other main profile application of MPEG-2, PAL DV and DVCAM, JPEG, MJPEG format.

In most image-encoding technology application, the YUV format, especially YUV4:2:0 is used widely for saving storage space. YUV4:2:0 means that only one color value is sample and store in 2:1 sampling rate for each scan line. The adjacent scan line stores different color value. Namely, if a line is 4:2:0, then the next line is 4:0:2, and the next adjacent line is again 4:2:0 . . . etc. The sampling rate in the horizontal and the perpendicular direction for each color value is 2:1, therefore the sampling rate for each color value is 4:1. The YUV4:2:0 is especially suitable for the standard PAL color system and the standard SECAM color system. And most video coder/decoder uses the YUV4:2:0 format for standard input format.

Figure 5:
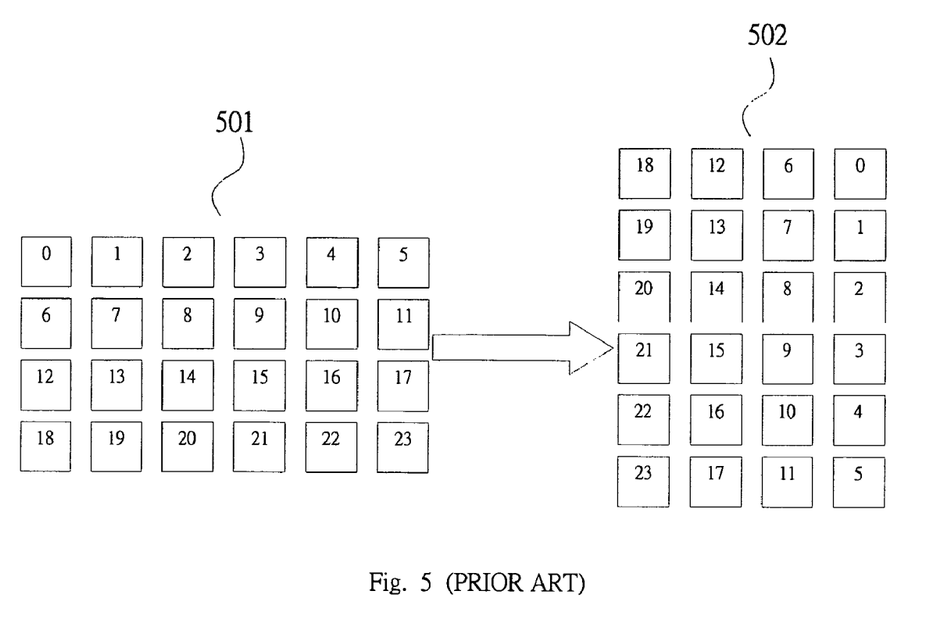
FIG. 5 is a schematic diagram of transforming a RGB format image.

A typical 6×4 RGB image 501 is shown in FIG. 5 which is usually used in computer image application. No matter for RGB1, RGB4, RGB8, RGB565, RGB555, RGB24 or RGB32, each pixel has its independent value, and the order of each pixel imply to the continuous position in the memory. The image 501 can be rotated clockwise 90 degree to a rotated image 502 directly.

The YUV format, except for YUV4:4:4, each pixel has its Y value, and U, V values are dependant to each other between neighbor pixels, therefore it is difficult to rotate image directly. Originally, to rotate YUV format image, the image should be transformed to YUV4:4:4. Then the color space of the image is transformed to RGB by the equation mentioned above. After rotating, the image is transformed back to YUV format. Therefore, it takes longer time to transform YUV format image than RGB format image.

In view of the aforementioned, the present invention provides an improved method of rotating YUV4:2:0 color space for digital video device to overcome the above drawback.

SUMMARY OF THE INVENTION

To achieve the foregoing and other objects and according to the purpose of the present invention, A method for rotating image and system of the same are disclosed. The present invention provides a method for transforming a YUV color space, the method comprises the steps of: separating Y division matrix from the YUV color space to remain U, V division matrix in the color space. Subsequently, the separated Y division matrix is transformed to achieve a transformed Y division matrix, and the U, V division matrix is transformed to achieve transformed U, V division matrix. And the following step is to combine the transformed Y division matrix with the transformed U, V division matrix. The Y indicates the brightness factor of the image, U, V stand for the blue and red color factors that remove the Y factor, respectfully.

In another aspect, the present invention discloses a method for transforming a YUV color space, the method comprises the steps of: separating Y division matrix from the YUV color space to remain U, V division in the color space; performing a matrix rotation calculation to the Y division matrix; performing a reverse matrix rotation calculation to the U and V division matrix; and combining the processed Y division matrix with the processed U and V division matrix to achieve the transformed YUV color space.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENT

Method and structure for transforming an image is described below. In the following description, numerous specific details are set forth in order to provide a thorough understanding of the present invention, and the scope of the present invention is expressly not limited expect as specified in the accompanying claims.

Figure 6:
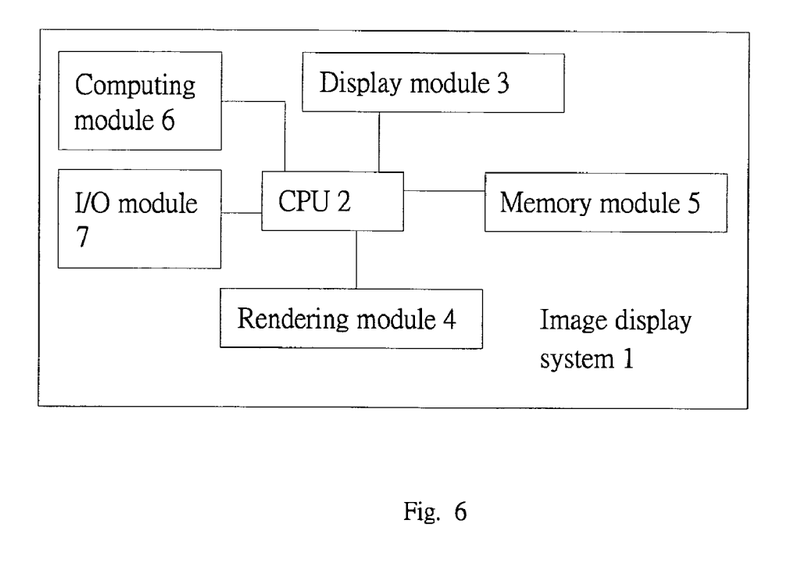
FIG. 6 is a schematic diagram of an image display system of the present invention.

The present invention is related to an image rotating system 1 such as TV-setbox. The image rotating system 1 comprises: a display module 3, a rendering module 4, a memory module 5, CPU unit 2, a computing module 6, and I/O module 7. The rendering module 4 renders images on the display, and the memory module 5 is used to store the image data. The CPU unit 2 controls the computing module 6 for calculating according to the input from the I/O module 7. The computing module 6 should have the ability to perform matrix transformation.

In an original TV system, YUV color system using except RGB color system, while Y is for illumination, U and V is for color. The rotating of Y matrix is the same as RGB matrix, therefore can be separated. Because the human eyes are not so sensitive to color than to luminance, therefore a little chromatic aberration is acceptable.

A set of image data in YUV4:2:0 color system, is usually a compressed format, as shown in FIG. 4. The present invention disclosed a fast rotating YUV algorithm, especially for directly rotating image in YUV4:2:0 color space. Originally, the image data should be transformed to YUV4:4:4 format. Each pixel has an isolated y value, and u, and v value are depended on neighboring pixels, therefore they can not be rotated directly. The other method of rotating YUV4:2:0 image is to transform color space. Computing the RGB value of each pixel, then transforming to YUV after rotating. To rotating a JPEG format image, the DCT table need to be rotated first, and then uncompressed the image. The uncompressed result is YUV image.

Figure 7A:
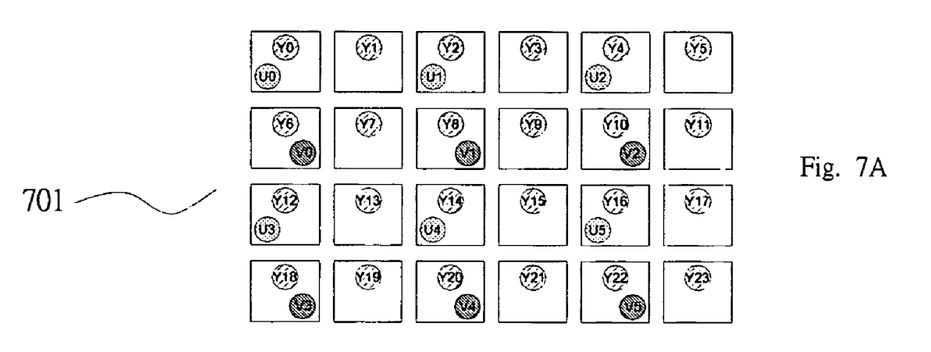
FIGS. 7A-7F is a schematic diagram of rotating YUV4:2:0 image clockwise according to the present invention.
Figure 7B:
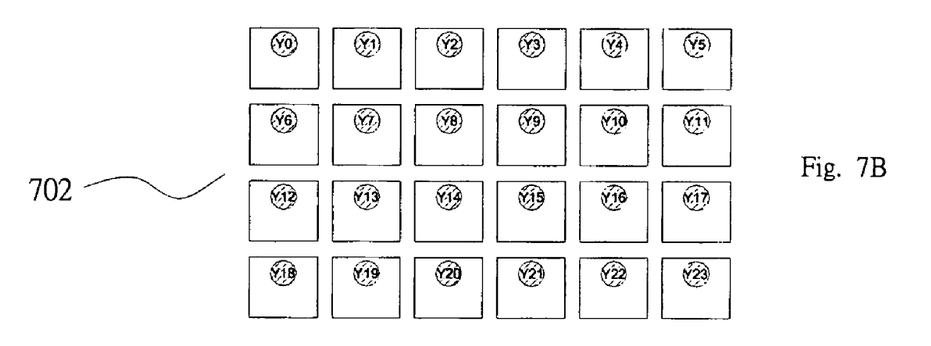

A 6×4 YUV4:2:0 color space 701 is shown in FIG. 7A, which is generally obtained after uncompressing a coded image, such as JPEG. At first, a Y division matrix 702 is separated as shown in FIG. 7B from the original data of color space as shown in FIG. 7A. Each pixel has an independent Y value in the data stream which is similar to the RGB data stream. Therefore, the Y division matrix 702 can be transformed, for instance rotation, in a desired direction or way. For instance, it could be rotated in a clockwise by applying clockwise rotation algorithm. One example in lieu of C Program language for the clockwise rotation algorithm is as follows:

```
for (x=0; x<original_pic_width; x++)
{
    for (y=original_pic_height-1; y>=0; y--)
    {
        *pTarget_pic = *(pOriginal_pic+(y*original_pic_width
        +x)+i);
        pTarget_pic++;
    }
}.
```

Figure 7C:
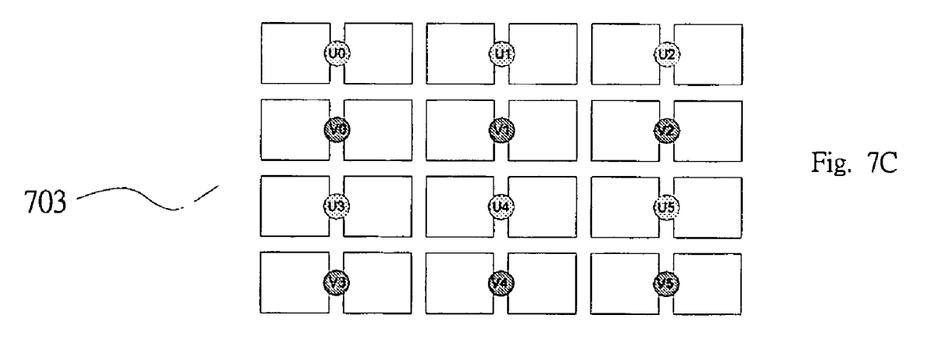
Figure 7D:
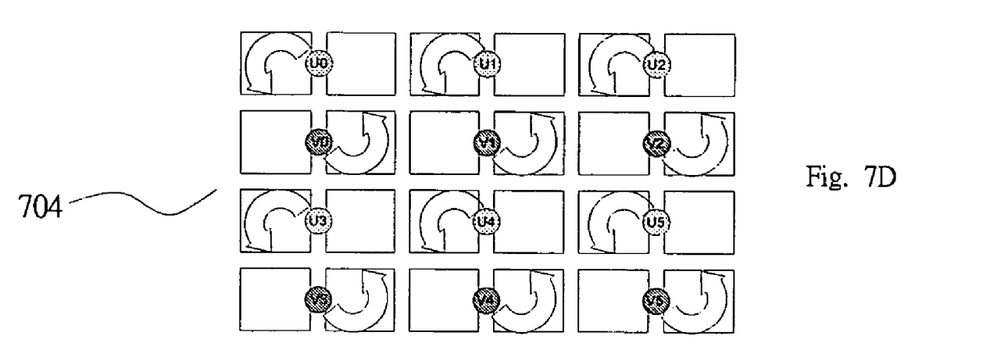
Figure 7E:
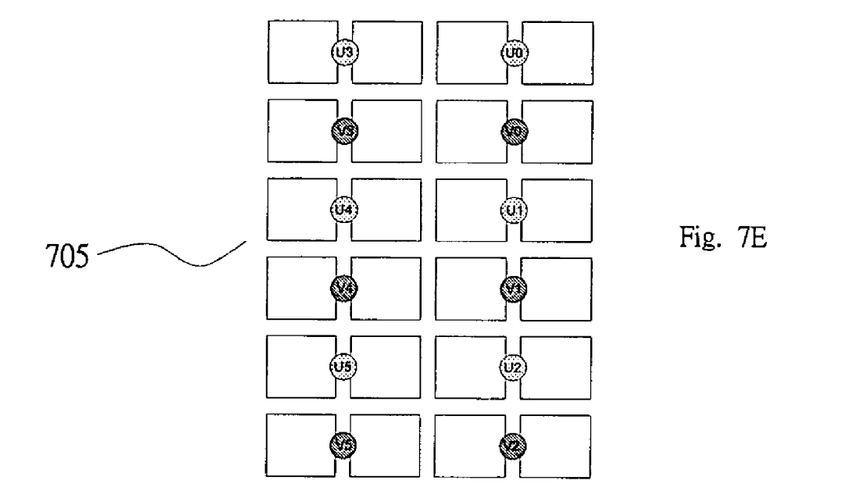
Figure 7F:
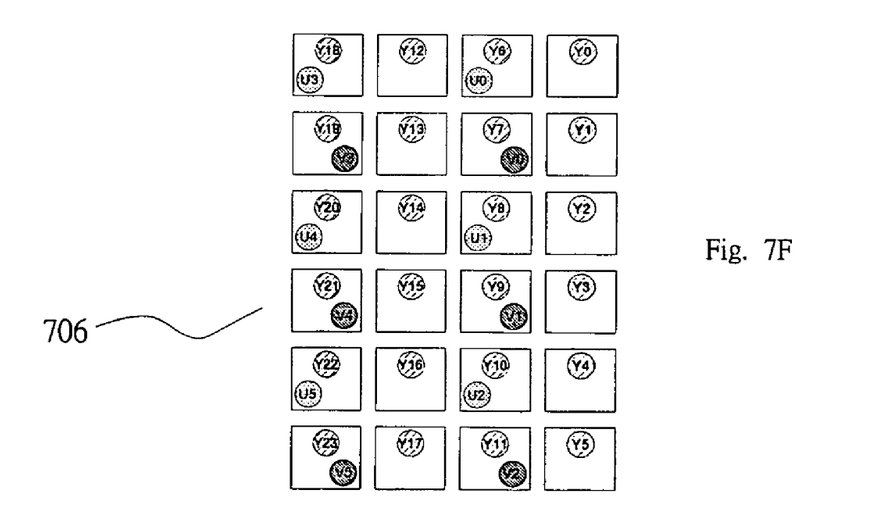

Then, the original U and V division matrix 703 as shown in FIG. 7C is rotated counter clockwise to corresponding position directly as shown in FIG. 7D. The result of the rotated U and V division matrix is shown in FIG. 7E. Finally, the rotated 4×6 YUV4:2:0 color space (image) 705 is obtained in FIG. 7F by combining the rotated y division matrix in FIG. 7B and the rotated U and V division matrix 704 in FIG. 7D. The clockwise rotation algorithm as mentioned above is as below:

```
for (x=0; x<original_pic_width; x++)
{
    for (y=original_pic_height-1; y>=0; y--)
    {
        *pLumaTarget = *(pLumaSrc+(y* original_pic_width+x));
        pLumaTarget++;
    }
}
for (x=0; x< original_pic_width; x+=2)
{
    for (y= original_pic_height/2-1; y>=0; y--) {
        *pChromaTarget = *(pChromaSrc+ original_pic_width*y+x);
        pChromaTarget++;
        *pChromaTarget = *(pChromaSrc+
```

-continued

```
        original_pic_width*y+x+1);
        pChromaTarget++;
    }
}.
```

Figure 8A:
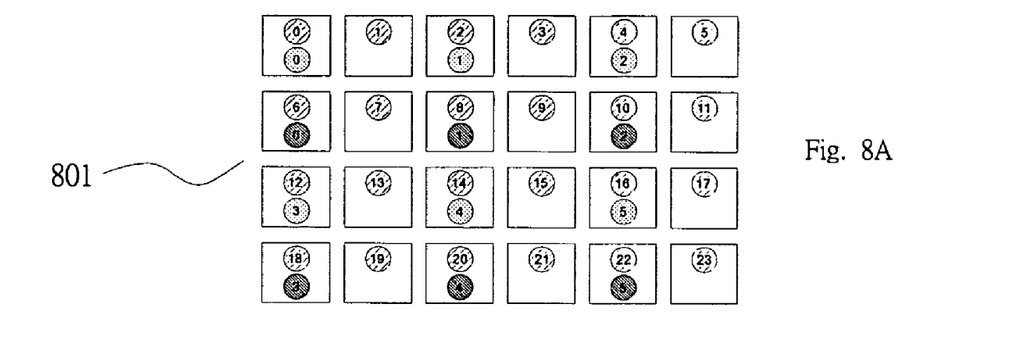
FIGS. 8A-8E is a schematic diagram of rotating YUV4:2:0 image counter clockwise according to the present invention.
Figure 8B:
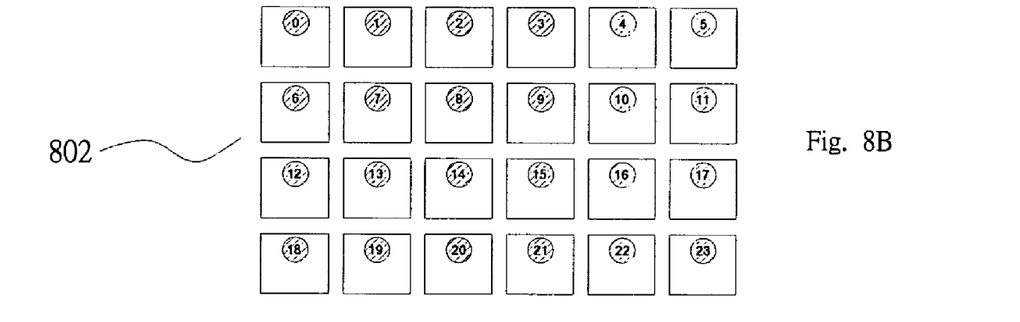
Figure 8C:
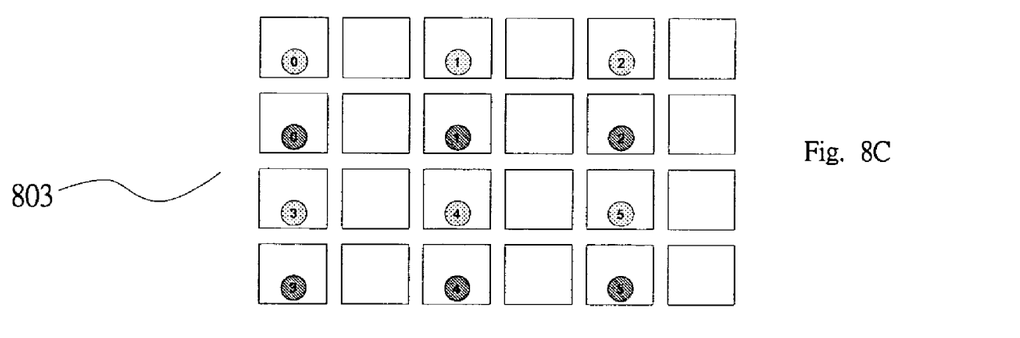
Figure 8D:
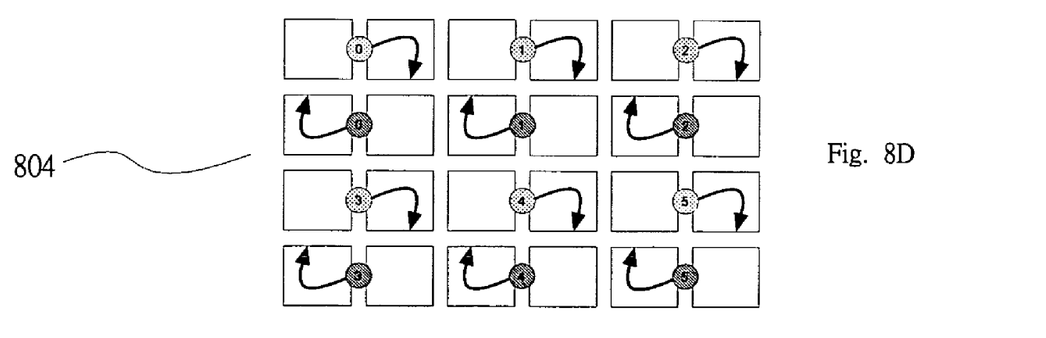
Figure 8E:
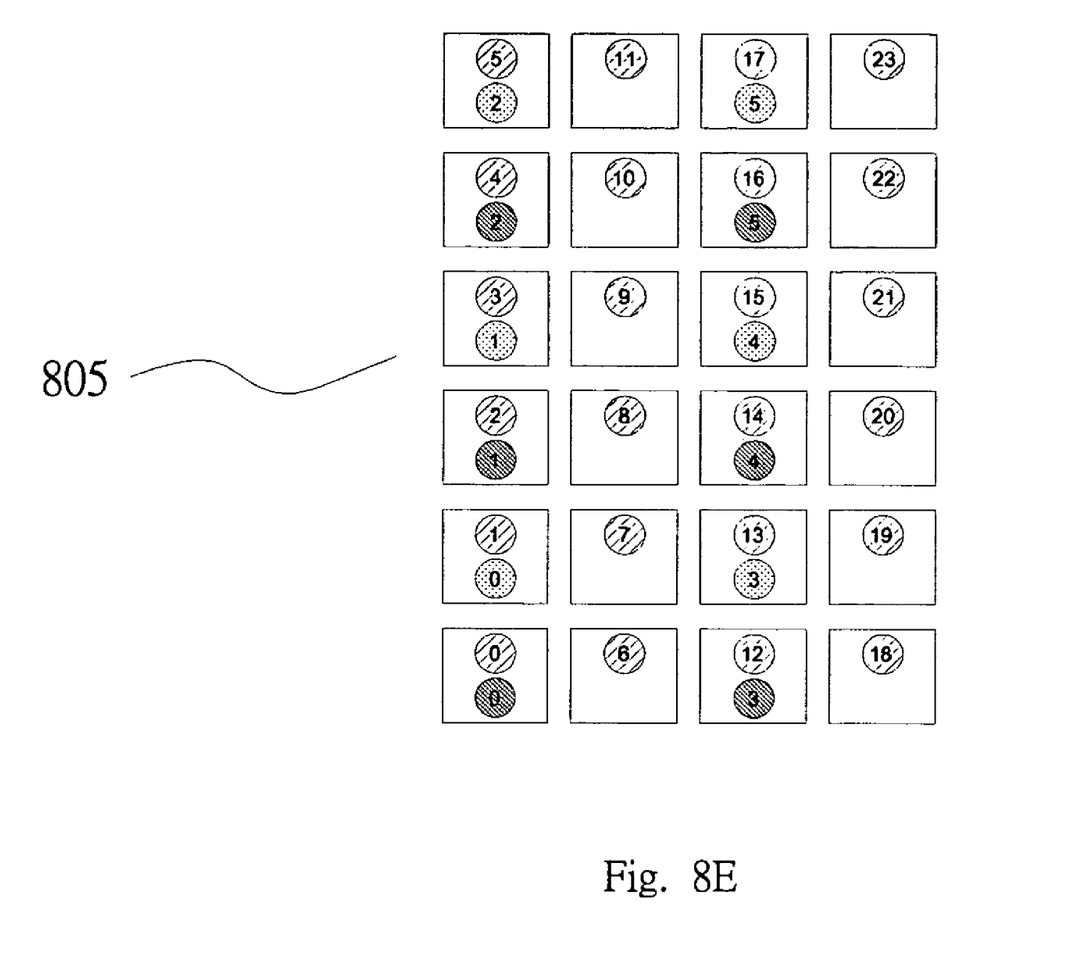

In the same way, FIGS. 8A to 8E shows a counter clockwise rotation of YUV4:2:0 image of the present invention. The original 6×4 YUV image 801 is separated into a Y division matrix 802 and a u and v division matrix 803. The Y division 802 can be rotated counter clockwise directed. Then, the U and V division matrix 803 is rotated to correspondent position clockwise as shown in FIG. 8D. A counter clockwise rotation 4×6 YUV4:2:0 color space or image is obtained by combining the rotated Y division matrix and the rotated U and V division matrix 804. The counter clockwise rotation algorithm is as follows:

```
for (x= original_pic_width-1 ; x>=0; x++)
{
    for (y=0; y< original_pic_height; y--)
    {
        *pLumaTarget = *(pLumaSrc+(y* original_pic_width+x));
        pLumaTarget++;
    }
}
for (x= original_pic_width-2; x>=0; x-=2)
{
    for (y=0; y< original_pic_height/2; y++) {
        *pChromaTarget = *(pChromaSrc+ original_pic_width*y+x);
        pChromaTarget++;
        *pChromaTarget = *(pChromaSrc+
            original_pic_width*y+x+1);
        pChromaTarget++;
    }
}.
```

Figure 9A:
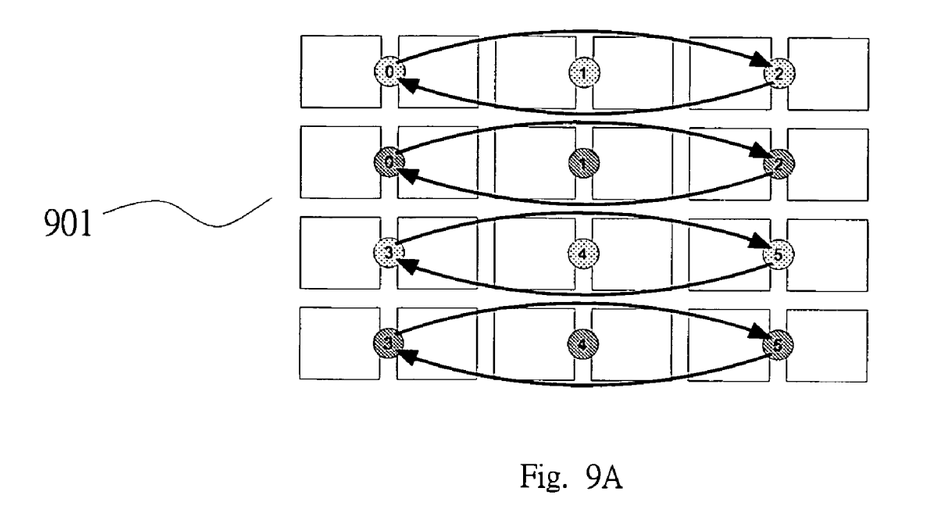
FIGS. 9A-9B is a schematic diagram of horizontally reflecting YUV4:2:0 image according to the present invention.
Figure 9B:
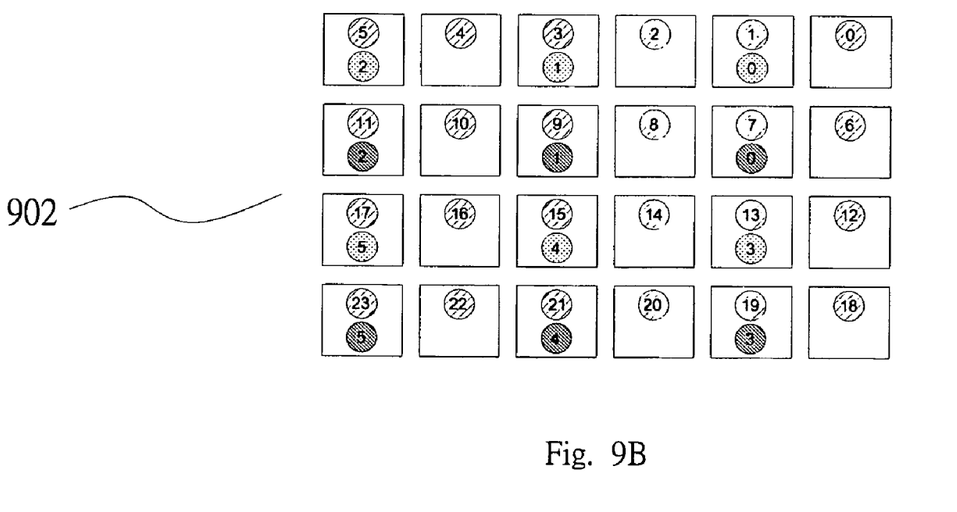

FIG. 9A and FIG. 9B show an embodiment of horizontal reflection of YUV4:2:0 of the present invention. The elements in U and V division matrix 901 are exchanged from left/right to right/left. Then, a horizontally reflected YUV4:2:0 image 902 is obtained by combining the rotated U and V division matrix 901 and the rotated Y division matrix as shown in FIG. 9B. The horizontal reflection algorithm is as follows:

```
for (y=0; y<pic_height; y++)
{
    for (x=pic_width-1; x>=0; x--)
    {
        *pLumaTarget = *(pLumaSrc+(y*pic_width+x));
        pLumaTarget ++;
    }
}
for (y=0; y<pic_height/2; y++)
{
    for (x=pic_width-2; x>=0; x-=2)
    {
        *pChromaTarget = *(pChromaSrc+pic_width*y+x);
        pChromaTarget ++;
        * pChromaTarget = *( pChromaSrc +pic_width*y+x+1);
        pChromaTarget ++;
    }
}
```

Figure 10A:
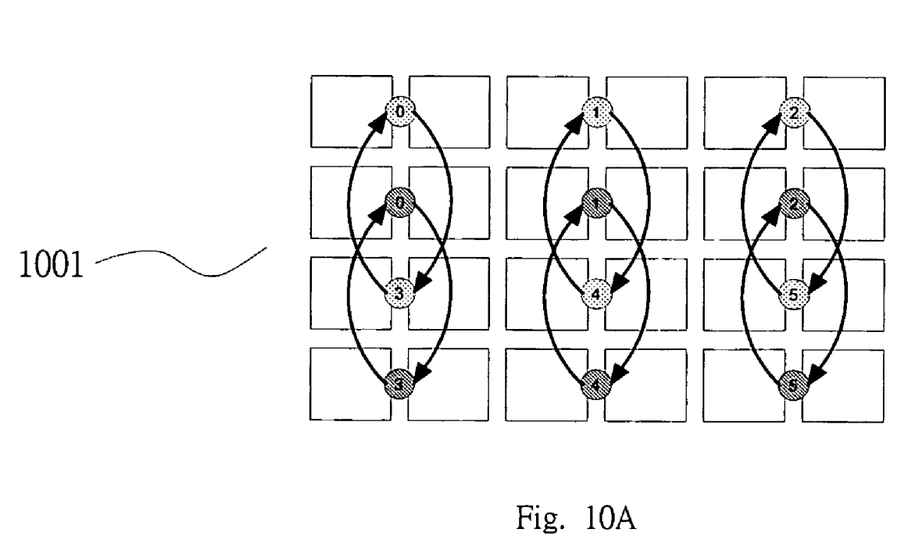
FIGS. 10A-10B is a schematic diagram of perpendicularly reflecting YUV4:2:0 image according to the present invention.
Figure 10B:
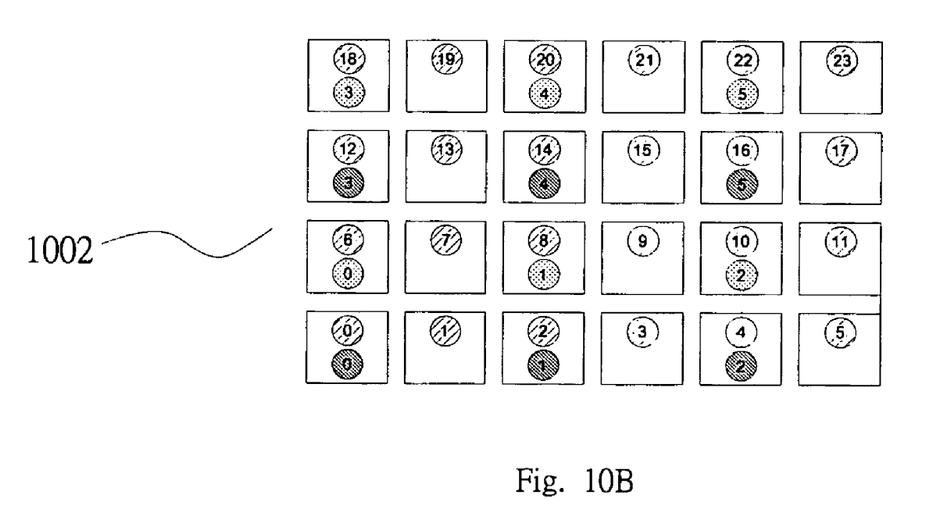

FIG. 10A and FIG. 10B show an embodiment of perpendicular reflection of YUV4:2:0 of the present invention. The upper elements in U and V division matrix 1001 are exchanged with lower elements. Then, a horizontally reflected YUV4:2:0 image 1002 is obtained by combining the rotated U and V division matrix 1001 and the rotated Y division matrix as shown in FIG. 10B. The perpendicular reflection algorithm is as follows:

```
for (y=pic_height-1; y>=0; y++)
{
    for (x=0; x<pic_width; x++)
    {
        * pLumaTarget = *(pLumaSrc+(y*pic_width+x));
        pLumaTarget ++;
    }
}
for (y=pic_height/2-1; y>=0; y++)
{
    for (x=0; x<pic_width; x++)
    {
        *pChromaTarget = *(pChromaSrc+pic_width*y+x);
        pChromaTarget ++;
    }
}
```

Especially, the detail program code of the rotation and the reflection algorithms mentioned above provide a thorough understanding of the present invention but not limit the scope of the present invention. The rotation method of the present invention can be performed in any angle. And the reflection axis of the present invention is no limited to horizontal or perpendicular.

In conclusion, the present invention provides a fast rotating YUV imaging method, especially for a YUV4:2:0 image system. The method includes clockwise rotating algorithm, counter clockwise rotating algorithm, horizontal reflection algorithm, perpendicularly algorithm. The system according to the present invention may be applied in a PAL standard and SECAM standard color system. The advantage of the present invention is to rotate a YUV4:2:0 format image directly, just as the rotating method in RGB color space. Therefore, the method of the present invention provides an efficient method of rotating image in a video system.

Although specific embodiments have been illustrated and described, it will be obvious to those skilled in the art that various modifications may be made without departing from what is intended to be limited solely by the appended claims.

What is claimed is:

1. A method for transforming a YUV color space, comprising:
   separating Y division matrix from said YUV color space to remain U, V division matrix in said color space;
   transforming said separated Y division matrix to achieve a transformed Y division matrix and transforming said U, V division matrix to achieve transformed U, V division matrix; and
   combining said transformed Y division matrix with said transformed U, V division matrix to obtain a transformed YUV color space.

2. The method in claim 1, wherein said Y division matrix is transformed by applying clockwise rotation algorithm.

3. The method in claim 2, wherein said U, V division matrix is transformed by applying counter clockwise rotation algorithm.

4. The method in claim 1, wherein said Y division matrix is transformed by applying counter clockwise rotation algorithm.

5. The method in claim 4, wherein said U, V division matrix is transformed by applying clockwise rotation algorithm.

6. The method in claim 1, wherein said Y division matrix is transformed by applying reflection algorithm.

7. The method in claim 6, wherein said U, V division matrix is transformed by applying reflection algorithm.

8. A method for transforming a YUV color space, comprising:
   separating Y division matrix from said YUV color space to remain U, V division matrix in said color space;
   performing a matrix rotation calculation to said Y division matrix;
   performing a reverse matrix rotation calculation to said U and V division matrix; and
   combining said processed Y division matrix with said processed U and V division matrix to achieve said transformed YUV color space.

9. The method in claim 8, wherein said matrix rotation calculation includes clockwise rotation calculation.

10. The method in claim 9, wherein said clockwise rotation calculation includes clockwise rotation with 90 degree calculation.

11. The method in claim 8, wherein said matrix rotation calculation includes counter clockwise rotation calculation.

12. The method in claim 11, wherein said counter clockwise rotation calculation includes counter clockwise rotation with 90 degree calculation.

13. The method in claim 8, wherein said matrix rotation calculation includes reflection calculation.

14. The method in claim 13, wherein said reflection calculation includes horizontal reflection calculation.

15. The method in claim 13, wherein said reflection calculation includes perpendicular reflection calculation.

16. The method in claim 8, wherein said reverse matrix rotation calculation includes counter clockwise rotation calculation.

17. The method in claim 9, wherein said reverse clockwise rotation calculation includes counter clockwise rotation with 90 degree calculation.

18. The method in claim 8, wherein said reverse matrix rotation calculation includes clockwise rotation calculation.

19. The method in claim 11, wherein said clockwise rotation calculation includes clockwise rotation with 90 degree calculation.

20. The method in claim 8, wherein said reverse matrix rotation calculation includes reflection calculation.

21. The method in claim 13, wherein said reflection calculation includes horizontal reflection calculation.

22. The method in claim 13, wherein said reflection calculation includes perpendicular reflection calculation.

* * * * *